Oct. 24, 1944. C. R. KEEP ET AL 2,361,350
DRYING APPARATUS
Filed Dec. 30, 1941
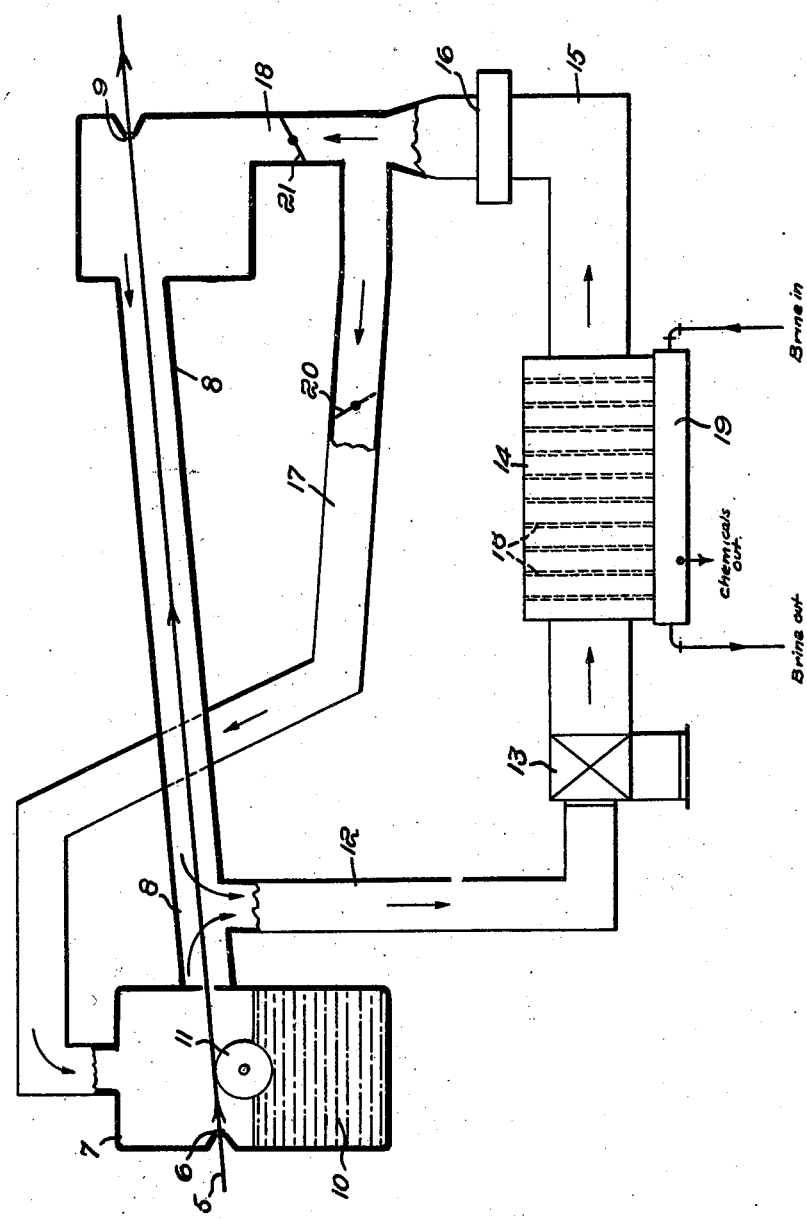
Inventor
CHARLES R. KEEP and
ALBERT W. FERRE
By Robert T. Palmer
Attorney Patented Oct. 24, 1944

2,361,350

UNITED STATES PATENT OFFICE 2,361,350

DRYING APPARATUS

Charles R. Keep, Norwood, and Albert W. Ferre, Wellesley, Mass., assignors to B. F. Sturtevant Company, Boston, Mass.

Application December 30, 1941, Serial No. 424,890

2 Claims. (Cl. 91—55)

This invention relates to drying apparatus and relates more particularly to combining the drying of a continuously moving, chemically treated wire or sheet, with the recovery of chemicals evaporated therefrom.

In the drying of wire or sheet and the like which are processed with chemical solutions, and which move continuously through the dryers, losses of the chemicals occur due to their being evaporated in vapor so dilute that it has not been considered possible heretofore economically to recover them.

This invention provides for the recovery of chemicals from the dilute vapors evaporated during the drying by recirculating the vapors with the drying air in a closed circuit until a high vapor pressure is built up, and then collecting the chemicals from the concentrated vapor.

In a preferred embodiment of the invention, the chemical processing equipment is included in the dryer structure, with a portion of the drying air collecting the vapors given off in the processing and adding them to the vapors evaporated during the drying, for recovery.

In one embodiment of the invention, vapor given off from a bromine and carbon tetrachloride solution in the treating of rubber covered wire and evaporated from the wire in the drying steps, has a vapor pressure of only 0.2 millimeter. The drying air containing this vapor is continuously recirculated in contact with dehumidifying surfaces chilled to 40° F. After a period of time, through recirculation, the vapor pressure is built up to saturation at 40° F., whereupon the chemicals are condensed upon the surfaces and collected in liquid form. The drying gas is heated to the drying temperature at the down-stream side of the dehumidifier and is recirculated in contact with the treated material, the recirculated gas serving to concentrate the chemical vapors for collection and to dry the treated material.

An object of the invention is to combine in the drying of chemically treated material, the recovery of chemicals from the vapors in the drying gas.

Another and more definite object of the invention is to combine in a dryer for chemically treated material, means for the recirculation of dilute chemical vapors in a closed circuit including the vapor source, the drying path and a dehumidifier.

The invention will now be described with reference to the drawing which illustrates diagrammatically one embodiment of the invention included in a dryer for chemically treated rubber wire.

The dryer illustrated is generally similar to that disclosed by the A. W. Ferre Patent No. 2,005,580 which issued June 18, 1935, and accordingly that patent may be referred to for details not essential for an understanding of the novel features of the present invention.

Referring now to the drawing, the rubber covered wire 5 to be treated, is moved in the order named, through the seal 6 into the chemical treatment chamber 7, the dryer tube 8 and then through the seal 9, from the apparatus.

The chamber 7 has in its lower portion a sump containing the solution 10 of bromine and carbon tetrachloride, and the rotary application wheel 11 which revolves in contact with the solution and with the wire 5 for applying the solution to the surface of the wire.

The chemical solution provides a glaze surface upon the wire which enables it to be handled more easily as in being easily untied from knots tied therein.

The duct 12 connects into the tube 8 adjacent and at the downstream side of the chamber 7, and connects through the centrifugal fan 13 with the inlet of the condenser 14. The duct 15 which contains the heater 16 is connected to the outlet of the condenser 14 and to the branch duct 17 which is connected into the upper portion of the chamber 7, and to the branch duct 18 which connects with the tube 8 adjacent the seal 9.

The seals 6 and 9 serve to prevent the escape of vapors from, and the entry of atmosphere air into, the apparatus, and may be of the air seal type disclosed in said Ferre patent.

The condenser 14 contains a plurality of spaced metal tubes 18 coated with corrosion resisting, antimony lead, and brine from a suitable refrigeration source is pumped through the tubes. In the embodiment illustrated 108 gallons per minute of brine are pumped through the condenser tubes at an entering temperature of 20° F. and a leaving temperature of 24° F. This enables the condenser to chill the gas passing from the fan 13 in contact with same, to a dew point temperature of 40° F.

The gas leaving the condenser 14 is heated by the steam heater 16 to say, for example, 180° F. and the portion of this air through the duct 18 and tube 8 serves to dry the wire 5 during its passage through the tube 8.

The portion of the heated gas passing through the duct 17 into the chamber 7, serves to cause the chemical vapors in the chamber, together with the chemical vapors from the tube 8, to pass into the duct 12. The temperature of the gas entering the duct 12 is about 140° F.

The chemical vapors added in each circuit have a vapor pressure of only about 0.2 millimeter. The dew point temperature at this pressure is so low that the cost of condensing the chemicals at such a low vapor pressure would exceed the value of the chemicals recovered. But by continuous recirculation after a period of time which in the embodiment illustrated amounts to about three hours and ten minutes, the vapor pressure increases until the dew point is only 40° F., the temperature of the condenser tubes 18. The liquid condenses upon the surfaces of the tubes and drains by gravity into the sump 19 from which it may be collected as desired.

The dampers 20 and 21 are used to adjust the proportions of the heated gas passing through the ducts 17 and 18 as experience shows to be desirable.

While one embodiment of the invention has been described for the purpose of illustration, it should be understood that the invention is not limited to the exact apparatus and arrangement of apparatus illustrated as modifications thereof may be suggested by those skilled in the art without departure from the essence of the invention.

We claim:

1. A combined chemical treatment, drying and chemical recovery system, comprising a treatment chamber having a reservoir for chemical solution, means in said chamber for applying chemical solution to material passing therethrough, an elongated drying duct connected at one of its ends to said chamber for receiving material leaving same, a second duct connected to said duct adjacent said one of its ends and at the other of its ends, a fan, a chemical recovery chamber, a heater, means connecting said fan, said last mentioned chamber and said heater in said duct in series with respect to gas flow therethrough, and a third duct connected at one end to said second duct between its point of connection to said first duct and said heater, and connected at its other end to said treatment chamber.

2. A combined chemical treatment, drying and chemical recovery system, comprising a treatment chamber having a reservoir for chemical solution, means in said chamber for applying chemical solution to material passing therethrough, an elongated drying duct connected at one of its ends to said chamber for receiving material leaving same, a second duct connected to said duct adjacent said one of its ends and at the other of its ends, a fan, a chemical recovery chamber, a heater, means connecting said fan, said last mentioned chamber and said heater in said duct in series with respect to gas flow therethrough, a third duct connected at one end to said second duct between its point of connection to said first duct and said heater, and connected at its other end to said treatment chamber, and means for regulating the proportions of gas flow through said first duct and said third duct.

CHARLES R. KEEP.
ALBERT W. FERRE.